Figure 1:
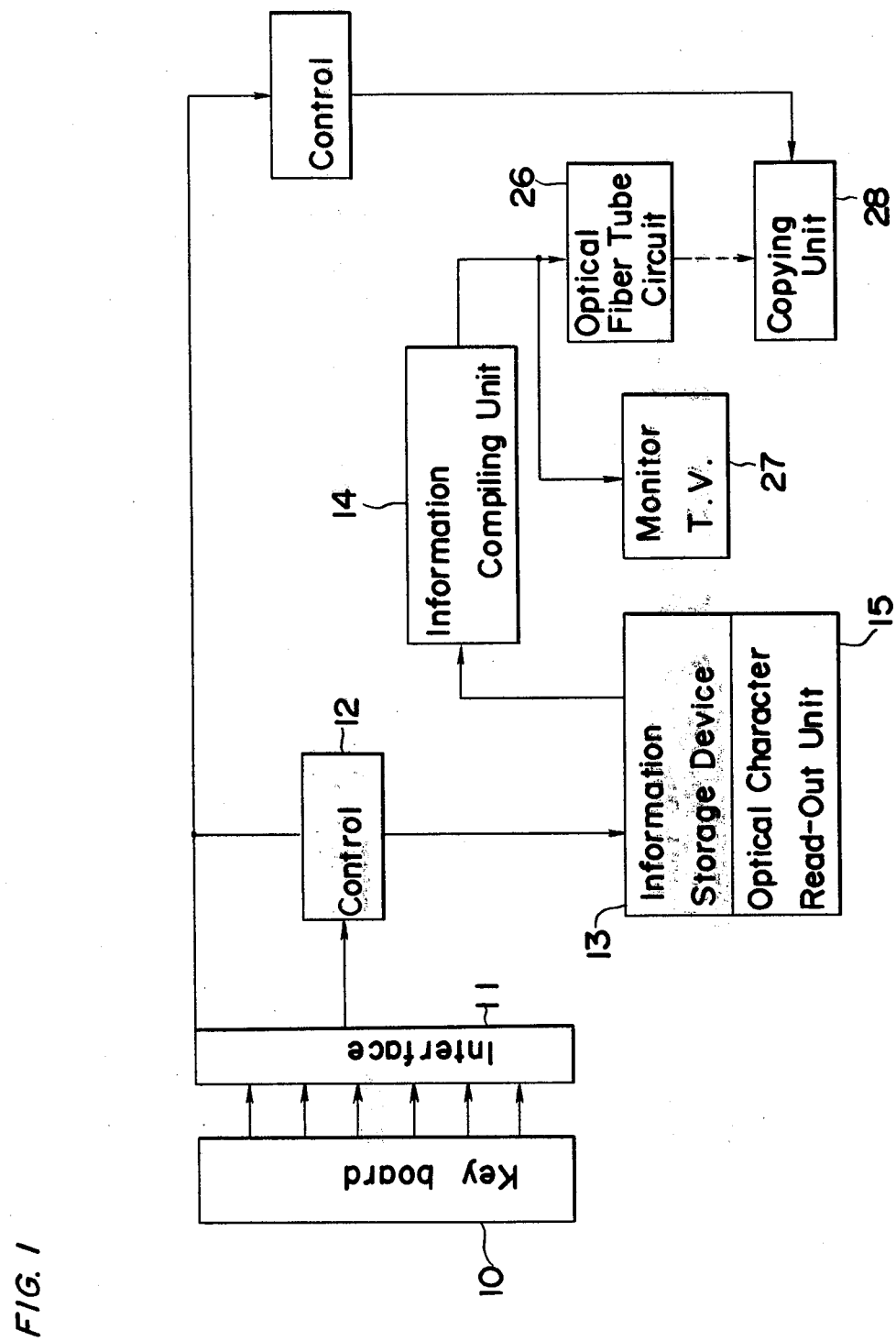

United States Patent [19]

Tanaka et al.

[11] 4,026,642
[45] May 31, 1977

[54] IDENTIFICATION CARD ISSUING APPARATUS

[75] Inventors: Atsuyuki Tanaka; Masaaki Oyabu, both of Sakai, Japan

[73] Assignee: Minolta Camera Kabushiki Kaisha, Osaka, Japan

[22] Filed: Jan. 22, 1975

[21] Appl. No.: 542,905

[30] Foreign Application Priority Data

Jan. 24, 1974  Japan .............................. 49-10748

[52] U.S. Cl. .............................. 355/1; 235/61.9 R; 355/3 R; 355/20
[51] Int. Cl.² ......................................... G03B 27/00
[58] Field of Search .............. 240/1 LP; 355/1, 20, 355/3 R, 5; 235/61.11 E, 61.7 B, 61.9 R; 340/173 LT, 173 LS

[56] References Cited

UNITED STATES PATENTS

| | | | |
|---|---|---|---|
| 3,658,407 | 4/1972 | Kitano et al. | 355/1 |
| 3,722,995 | 3/1973 | Dahlquist | 355/20 |
| 3,741,651 | 6/1973 | Nishiyama et al. | 355/20 |
| 3,824,604 | 7/1974 | Stein | 355/1 |
| 3,834,803 | 9/1974 | Tsukada | 240/1 LP |
| 3,872,462 | 3/1975 | Lemelson | 355/3 R |
| 3,881,098 | 4/1975 | Rich | 355/20 |
| 3,961,161 | 6/1976 | Ueda et al. | 235/61.9 R |

Primary Examiner—L. T. Hix
Assistant Examiner—J. A. LaBarre
Attorney, Agent, or Firm—Wenderoth, Lind & Ponack

[57] ABSTRACT

An apparatus for automatically issuing an identification card, such as a commutation ticket, airline ticket, credit card, driver's license or the like, which has information forming means having an information storage device for electromagnetically storing a coded information to be described on a web of paper to provide the identification card, a keyboard arrangement having a plurality of keys corresponding to the contents stored in the information storage device, a control device for selecting items from among the contents stored in the information storage device by operating the keyboard arrangement, and an information compiling device for compiling all of the coded information selected by the keyboard arrangement into a video signal information, a copying unit including a photoreceptor drum having the outer peripheral surface adapted to bear a latent image and an optical fiber tube which converts the video signal information into rays of light carrying the respective images of the coded information. The rays of light emitted from the optical fiber tube are projected onto the photoreceptor drum to form an image thereon, which image is electrostatically transferred onto the web of paper.

4 Claims, 6 Drawing Figures

IDENTIFICATION CARD ISSUING APPARATUS

The present invention relates to an apparatus for automatically issuing a printed identification card, such as a commutation ticket, an airline ticket, a credit card, a driver's license or the like, of a type wherein at least one selected data to be printed on one of blank entries in the identification card and a signature and/or other items relating to the user or possessor of the identification card, which are to be printed in the other entry in the identification card, are to be provided.

More particularly, the present invention has been developed to provide an apparatus for automatically issuing a printed commutation ticket bearing all necessary data including a reproduction of the signature of the potential user of the commutation ticket, in order to save on the labor required to perform this type of job, to minimize the time required for the purchaser to wait and to avoid any possible error which will otherwise occur if the necessary data are hand-written.

The present invention also pertains to an electric photostatic copying machine capable of printing, strictly speaking, reproducing, the necessary items or data on respective entries in the commutation ticket or the like, which copying machine is provided with an optical fiber tube for converting trains of pulses respectively indicative of the necessary data into beams of light which are in turn projected onto a rotating photoreceptor drum.

One of features of the present invention resides in that all the items to be printed in the respective entries in the commutation tickets or the like are displayed as they are on a monitor television set while a video signal indicative of the same items, which has been reproduced on the monitor television set, is converted into beams of light which are in turn projected onto the photoreceiptor drum of a copying machine so that the same items can be reproduced or printed on the commutation ticket or the like in a given arrangement.

Figure 2:
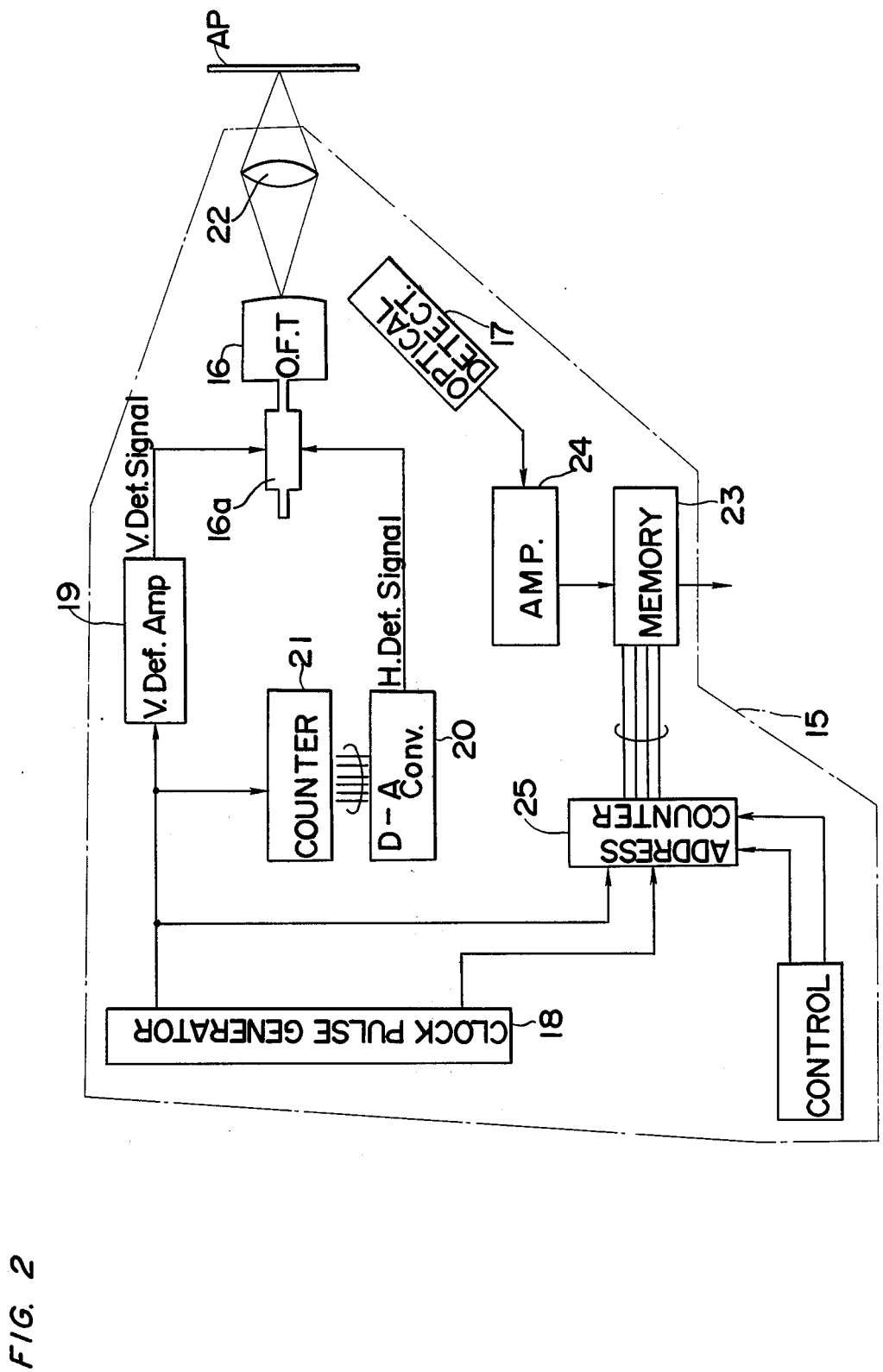
Figure 3:
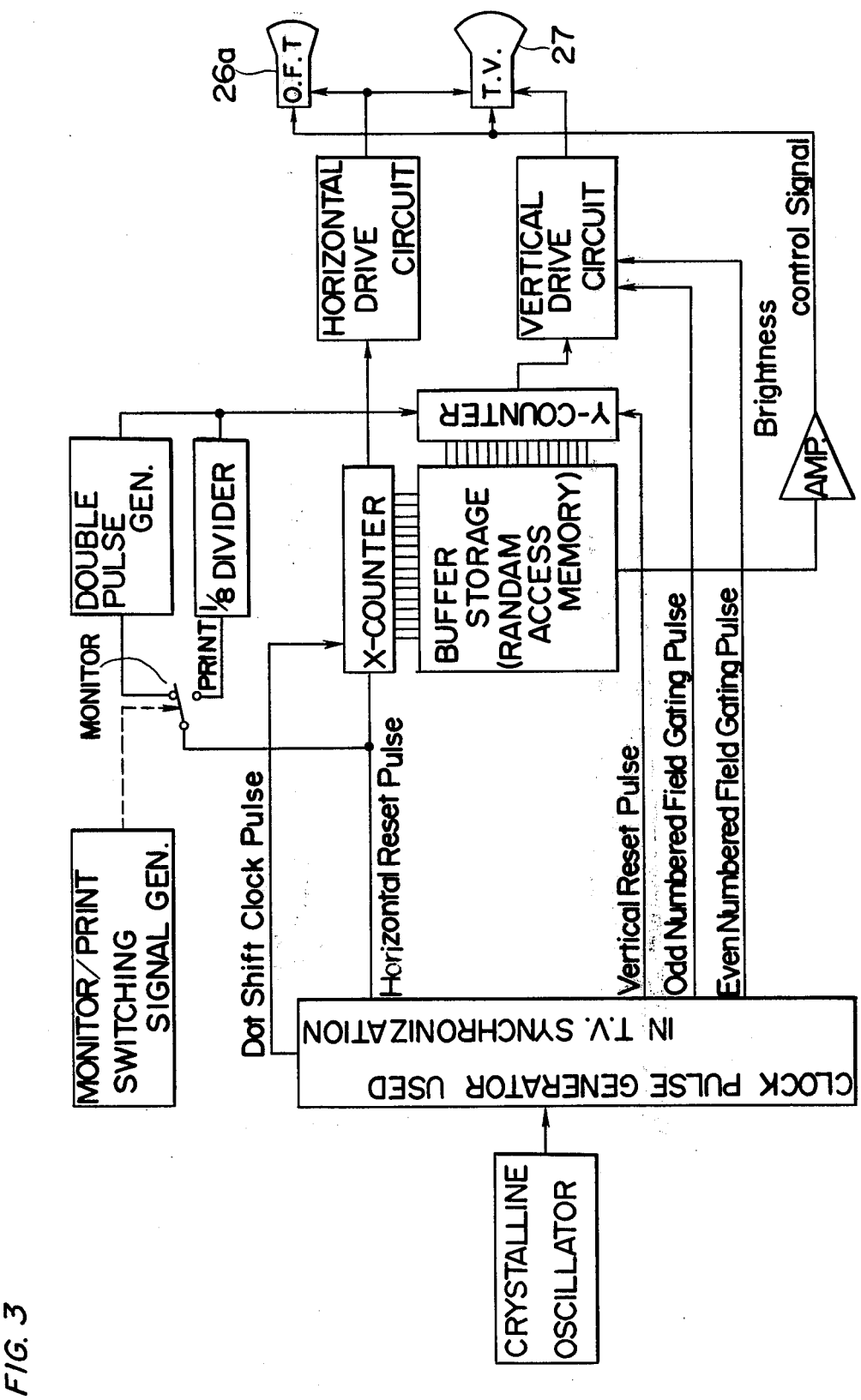
Figure 4:
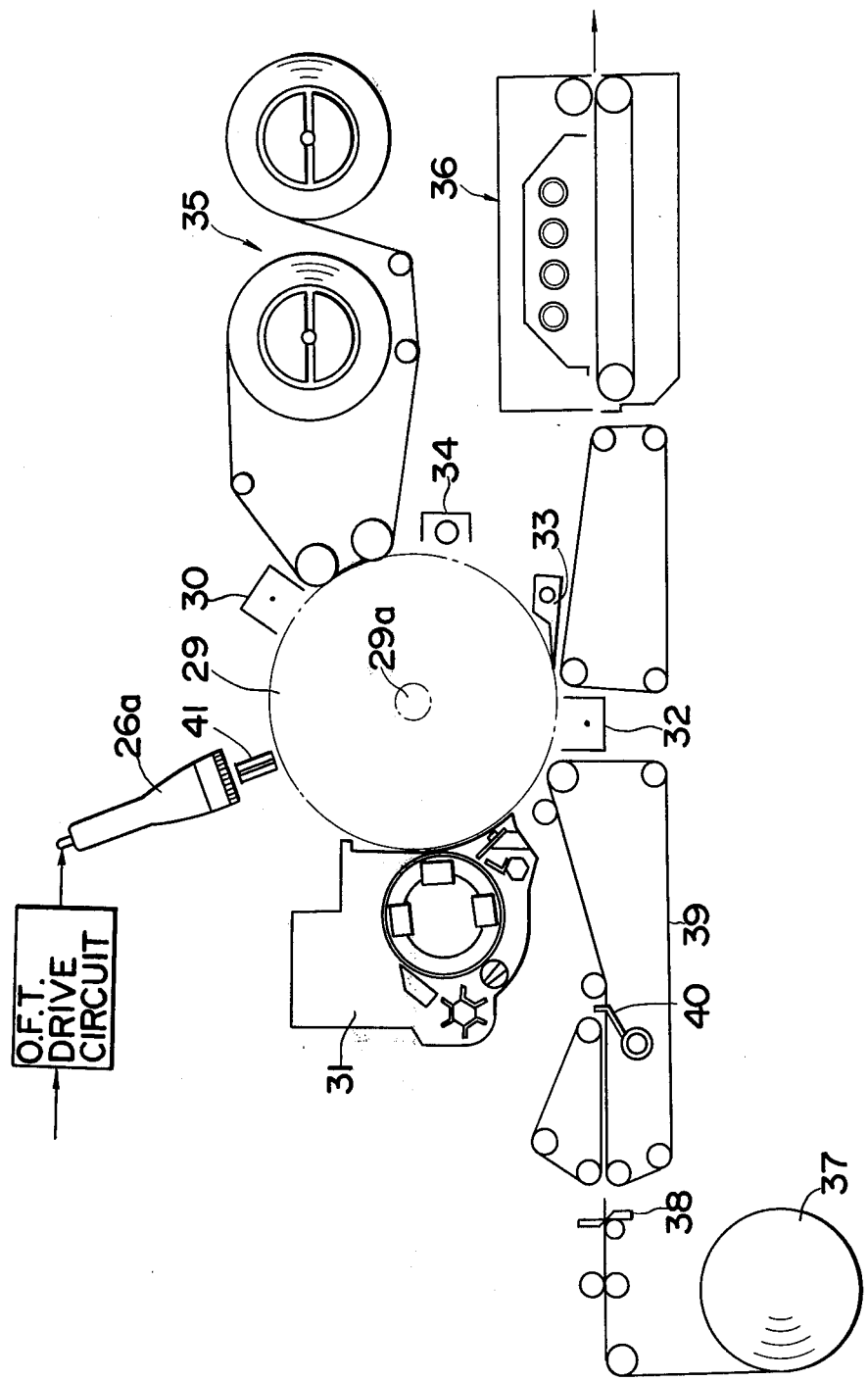
Figure 5:
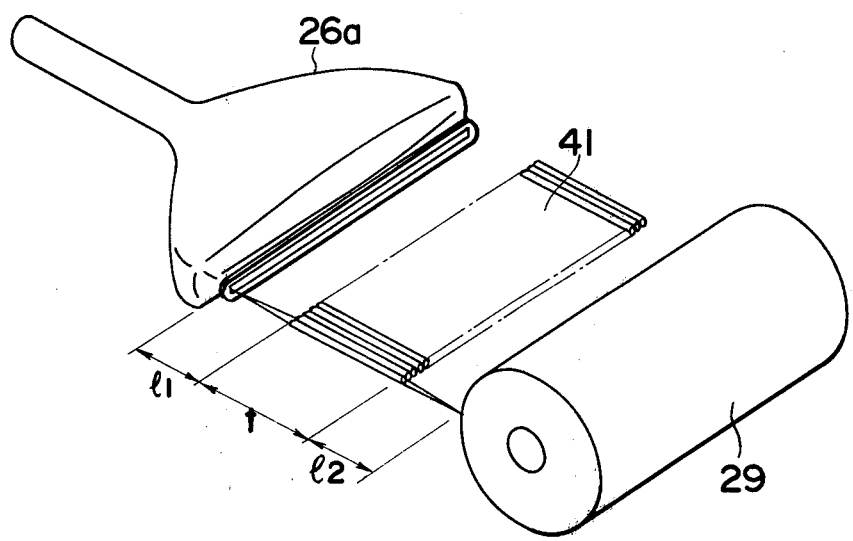
Figure 6:
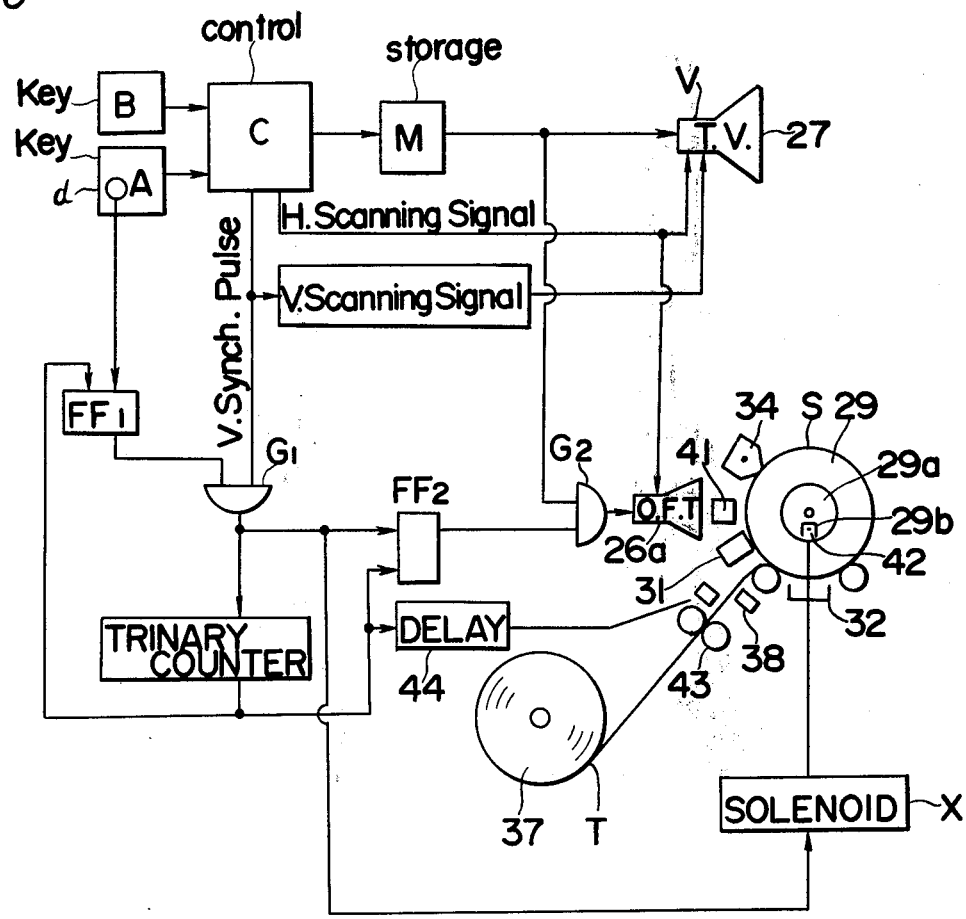

These and other objects and features of the present invention will become apparent from the following description taken in conjunction with preferred embodiments thereof with reference to the accompanying drawings, in which:

FIG. 1 is a schematic block diagram of an identification card issuing machine according to one preferred embodiment of the present invention, FIG. 2 is a schematic block diagram of an optical read-out unit employed in the machine of FIG. 1, FIG. 3 is a schematic block diagram of an information compiling unit employed in the machine of FIG. 1, FIG. 4 is a schematic diagram of an electrophotostatic copying unit employed in the machine of FIG. 1, FIG. 5 is a schematic perspective view of an essential portion of the electrophotostatic copying unit of FIG. 4, showing the manner by which an optical image of an item to be copied, which has been converted from a video signal, is projected onto the photoreceptor drum of the copying unit, and FIG. 6 is a schematic block diagram of an identification card issuing machine according to another embodiment of the present invention.

Before the description of the present invention proceeds, it should be noted that, for the sake of brevity, like parts are designated by like reference numerals throughout the accompanying drawings. It is also to be noted that, for facilitating a better understanding of the present invention, the present invention will be described as applied in the form of a commutation ticket issuing machine which automatically issues a commutation ticket bearing, in addition to all necessary information, a reproduction of the handwritten signature of the user of the commutation ticket. In practice, the necessary information to be printed on the commutation ticket the date of issue, the date of expiration, available railway section, applicable price, designation of railway line, one or more transit stations if required, and others and, therefore, the terms "necessary information" to be printed on the commutation ticket, which is herein employed, should be understood as including some or all of these items.

Referring now to FIG. 1, a commutation ticket issuing machine comprises a keyboard arrangement 10 composed of a plurality of key contacts (not shown). By operating one or more key contacts of the keyboard arrangement 10 in a known manner, a corresponding number of electrical signals are independently fed from the keyboard arrangement 10 to an interface 11 which in turn feeds through a control circuit 12 to an information storage device 13 consecutive signals indicative of the closure of such key contacts. The information storage device 13 stores therein numerical characters, names of railway stations and other items in the form of coded content and the information storage device 13, upon receipt of the consecutive signals indicative of closure of the key contacts, generate coded signals indicative of the contents to be read out from the information storage device 13 and corresponding to the closed key contacts. The coded signals from the information storage device 13 are then fed to an information compiling unit 14, the details of which unit 14 are shown in FIG. 3.

Simultaneously or separately with the coded signals from the information storage device 13, the information compiling unit 14 receives coded signals from an optical character read-out unit 15 which converts the handwritten signature of the user of the resultant commutation ticket into such coded signals, the details of which unit 15 will now be described with reference to FIG. 2.

The optical character read-out unit 15 comprises a light emitter 16 for emitting a scanning spot light and an optical detector 17 for detecting the reflected component of the scanning spot light and for converting the same into a train of pulses. The light emitter 16 employed is in the form of a known optical fiber tube having a deflection yoke 16a. A clock pulse generator 18 supplies clock pulses vertical to a deflection amplifier 19, which feeds a vertical deflection signal to the deflection yoke 16a of the optical fiber tube 16, and also to a digital-to-analog converter 20 through a counter 21, which converter 20 feeds a horizontal deflection signal to the deflection yoke 16a of the optical fiber tube 16.

The optical fiber tube 16 emits a spot light which is focused by a condensing lens 22 on a ticket purchasing application form AP so as to scan the handwritten signature of the purchaser on the application form AP. The application form AP may, either manually or by means of a paper drawing mechanism, be fed into position to receive the spot light from the optical fiber tube 16. It should be noted that either the optical fiber tube 16 or the application form AP is relatively positioned to the other so that the spot light from the optical fiber tube 16 scans an entry on the application form where the signature of the purchaser has been executed.

The optical detector 17 employed is in the form of a photomultiplier which detects rays of light that have been reflected from the application form AP and generates an electrical output signal indicative of the signature of the purchaser to a memory circuit 23 through an amplifier 24. An address counter 25 activates the memory circuit 23 so as to cause a content indicative of the signature stored in said memory circuit 23 to be transferred to the information compiling unit 14.

The information compiling unit 14, the details of which are shown in FIG. 3, acts to compile the character information which has respectively been fed from the information storage device 13 and the optical character read-out unit 15 in such a manner that all necessary information to be printed on the commutation ticket and the signature to be reproduced on the same commutation ticket are arranged in predetermined positions on the commutation ticket. Since the information compiling unit 14 essentially comprises a buffer storage device, for example, a randam access memory, it will readily be seen that, irrespective of the sequence of signals received by the unit 14 from the information storage device 13 and optical character read-out unit 15, the information compiling unit 14 generates a video signal indicative of the necessary information and the signature of the purchaser arranged in the predetermined order. The video signal emerging from the information compiling unit 14 is then fed in part to an optical fiber tube circuit 26 and in part to a monitor television set 27 of a known construction.

The monitor television set 27 may not be always necessary, but if employed, it is advantageous in that it can be monitored by the operator of the machine to insure that the video signal contains the correct information including the signature of the purchaser, prior to said information being printed on a web of paper, that is, a commutation ticket.

The optical fiber tube circuit 26 comprises a known optical fiber tube 26a which emits a scanning spot light, the intensity of which spot light varies in accordance with the video signal during movement of the spot light from one side extremity of the optical fiber tube 26a to the other side extremity. This spot light from the optical fiber tube 26a is transmitted to a copying unit 28 in a manner which will now be described with particular reference to FIGS. 4 and 5.

The copying unit 28 may be a known electrostatic copying machine, but according to the present invention, because of the commutation ticket being small in size and being substantially fixed in size, a small-sized electrostatic copying machine is preferred. Irrespective of the size, the copying unit 28 is substantially made up of various components similar to those employed in the known electrostatic copying machine and functions in a substantially similar manner to the known one.

More particularly, the copying unit 28 includes a photoreceptor drum 29 supported for rotation about a shaft 29a. During each rotation of the photoreceptor drum 29, the photoreceptor drum 29 is first electrostatically charged by a corona charger 30, subsequently exposed to the incoming rays of light transmitted from the optical fiber tube 26a so that a latent image is formed on the photoreceptor drum 29 and subjected to a developing process by means of a developer 31. During the developing process, only the portion of the photoreceptor drum 29 corresponding to the latent image formed thereon receives toner supplied from the developer 31, which toner is, during the continued rotation of said drum 29, transferred onto a web of paper at an image transfering station where an image transfer charger 32 is located. Thereafter, the web of paper to which the toner has been transferred in the form of the image is separated by a separator 33 on one hand and the electrostatic charge carried by the drum 29 is erased by a charger eraser 34 in readiness for the next exposure. Reference numeral 35 designates a cleaner for removing a possible residue of toner on the photoreceptor drum.

The web of paper thus separated by the separator 33 from the drum 29 is then fed to a fixing device 36 where the toner depicting the image on said web of paper is heat-fixed to provide a complete commutation ticket.

The construction and function of the copying unit 28 are both known and, therefore, the details thereof are herein omitted for the sake of brevity.

The copying unit 28 further includes a paper feed mechanism which comprises a roll of paper 37, a cutter 38 for cutting a web of paper from the roll 37 into a suitable or required size for the commutation ticket and an endless belt conveyor 39 for feeding the piece of paper, which has been cut from the roll 37 by the cutter 38, onto the photoreceptor drum 29. Reference numeral 40 designates a stop for temporarily retaining the cut piece of paper for the commutation ticket before the photoreceptor drum 29 commences to rotate. In other words, the stop 40 and the photoreceptor drum 29 are synchronized with each other so that the toner sticking to the photoreceptor drum 29 depicting the image can be exactly aligned with the cut piece of paper at the image transferring station.

As best shown in FIG. 5, between the optical fiber tube 26a and the photoreceptor drum 29, there is provided a light transmitter 41 formed by image transmitting optical fibers in a bundled configuration, each of said optical fibers having a refractive index distribution in cross section thereof that varies consecutively and parabolically outwards from a center portion, said refractive index distribution on satisfying an equation of $n = N(1 - ar^2)$ wherein $N$ is the refractive index at the center, $n$ is the refractive index at a distance $r$ from the center and $a$ is a positive constant. The above described optical fiber and the image transmitted formed by a bundle of above described optical fibers are described in the U.S. Pat. No. 3,658,407, patented on Apr. 25, 1972 and, therefore, reference may be made thereto for the details thereof.

Preferably, the space $l_1$ between the light emitting surface of the optical fiber tube 26a and one of the two ends of the image transmitter 41 adjacent said light emitting surface and the space $l_2$ between the other end of said image transmitter 41 and the photoreceptor drum 29 are substantially equal to each other in order for the light transmitter 41 to exhibit an optimum resolution.

The optical fiber tube 26a upon receipt of the video signal from the information compiling unit 14 converts the video signal into successive scanning rays of light, the intensity of which rays of light varies in accordance with the varying level of the video signal fed from the information compiling unit 14. In order to form a latent image on the photoreceptor drum 29 which is represented by the video signal, a relative movement should be effected between the optical fiber tube 26a and the photoreceptor drum 29. This can be easily achieved by rotating the photoreceptor drum 29 while the optical fiber tube 26a continues successive scans from one side extremity to the other. In other words, the optical image corresponding to the necessary information including the signature of the purchaser is exposed on the photoreceptor drum 29 in a substantially similar fashion as a video signal is reproduced on a cathode ray tube. Therefore, it will readily be understood that all the necessary information can be printed on the web of paper with the signature of the purchaser actually reproduced thereon. A complete commutation ticket bearing the necessary information and a reproduction of the signature of the purchaser are available as the web of paper emerges from the copying unit 28 and, more particularly, from the fixing device 36 of the copying unit 28.

Referring now to FIG. 6, reference characters A and B represent separate groups of function keys, the key group A being adapted to specify any one of items to be printed on the commutation ticket while the key group B is adapted to specify a letter. Reference characters C and M represent a control device and an information storage device, said information storage device M storing therein a plurality of letters in the form of coded signals. Reference character d represents a push button switch which when closed causes the photoreceptor drum 29 to rotate to carry out a copying process. This push button switch d may manually be closed preferably after the necessary information including the signature of the purchaser, which has been represented by the video signal, has been reproduced on the monitor television tube 27 and the operator of the machine has subsequently confirmed the correctness of the information reproduced on the monitor television set 27. If this push button switch d is closed, a flip-flop FF1 is set and an AND gate G1 is therefore triggered on to pass therethrough a vertical synchronizing pulse which is transmitted from the control circuit C. The vertical synchronizing pulse which has emerged from the AND gate G1 is fed to a trinary counter and to a flip-flop FF2. The flip-flop FF2 is, upon receipt of the vertical synchronizing pulse from the AND gate G1, set to generate a trigger pulse to an AND gate G2 whereby, during the duration of the trigger pulse applied to said AND gate G2, consecutive signals indicative of the information to be printed on the commutation ticket are permitted to pass through said AND gate G2 on to the optical fiber tube 26a so that the latter can generate a repeatedly scanning spot light onto the photoreceptor drum 29. It should be noted that the horizontal scanning velocity and frequency of the optical fiber tube 26a are selected so as to be higher than that of the monitor television tube 27.

The synchronizing pulse emerging from the AND gate G1 is also applied to a solenoid X to excite the latter. Upon excitation of the solenoid X, a latch lever 42 mechanically coupled to said solenoid X disengages from a recess 29b formed in the shaft 29a of the photoreceptor drum 29 to permit the latter to rotate. So long as the solenoid X is not excited, the drum 29 does not rotate since the latch lever 42 is engaged in the recess 42 in the drum shaft 29a. It is to be noted that simultaneously with rotation of the drum 29, a web of paper can be drawn from the roll 37 into the image transferring station by means of the paper feed mechanism which is, in the embodiment shown in FIG. 6, composed of at least one pair of drawing rolls 43.

On the other hand, as hereinabove stated, the vertical synchronizing pulse emerging from the AND gate G1 is applied to the trinary counter. The trinary counter generates an output signal both to the flip-flop FF2 and to a delay circuit 44 each time said trinary counter counts three vertical synchronizing pulses applied from the AND gate G1. The output signal applied to the flip-flop FF2 from the trinary counter resets said flip-flop FF2 and, consequently, the AND gate G2 is brought to a non-conductive state. The same output signal applied to the delay circuit 44 from the trinary counter is, after having been delayed a predetermined time, fed to a cutter 38 to operate the latter.

It is to be noted that during the period in which the trinary counter counts three vertical synchronizing pulses successively fed from the AND gate G1, a television picture indicative of the information to be printed on the commutation ticket is reproduced twice and, hence, the same commutation ticket can be prepared in duplicate; one being for use by the purchaser and the other for a file record on the part of the issuer of the commutation ticket. Therefore, it will readily be understood that in the case where a binary counter is employed in place of the trinary counter, only a single copy of commutation ticket can be prepared.

The photoreceptor drum 29 is operatively associated with the paper feed mechanism in such a manner that each time the photoreceptor drum 29 completes one rotation, the latch lever 42 engages in the recess 29b in the drum shaft 29a stopping the rotation of the drum 29 and the paper drawing roll 43. It is to be noted that since the time it takes for the recess 29b in the drum shaft 29a to move through its angular movement is chosen so as to be greater than the sum of the duration of three vertical synchronizing pulses, the same information can be reproduced or printed in two successive copies on a single piece of paper which has been cut from the web of paper by the cutter 38.

When the copying operation is to be performed in the manner as hereinabove described, care must be taken insure that the cut paper bearing blocks for entry of the items is exactly aligned with the latent image on the photoreceptor drum 29 thereby to avoid a possible displaced reproduction or printing. To avoid the possible displaced reproduction, any suitable positioning mechanism which is substantially composed of a combination of sprocket wheel and a plurality of perforations formed in the roll of paper along at least one side edge may be employed. In this case, the position of the perforations in the web of paper into which the sprocket wheel engages must be predetermined relative to the position of the latent image on the photoreceptor drum so that one complete rotation of the recess 29b in the drum shaft 29a can feed a portion of the web of paper having a length corresponding to the sum of the respective lengths of two commutation tickets. Moreover, the photoreceptor drum 29 and the sprocket wheel must be mechanically associated with each other in such a manner that, while a drive motor is constantly rotated and either the drive shaft of the sprocket wheel or the drum shaft 29a is frictionally coupled to the drive shaft of the drive motor during engagement of the latch lever 42 into the recess 29b in the drum shaft 29b, the sprocket wheel commences to rotate to feed the web of paper in engagement with the perforations in said web of paper only when the latch lever 42 disengages from the recess 29b in the drum shaft 29a.

So far as a method of positioning the web of paper relative to the photoreceptor drum is concerned, a photoelectric detecting system may alternatively be employed. In this case, the arrangement may be such that a photoelectric detector detects each of equally spaced markings provided on the web of paper and, upon detection of a predetermined number of the markings which have moved past the photoelectric detector, generates a control signal and feeds to the paper feed mechanism to cause the latter to cease its operation.

The machine according to the present invention the construction of which has been described in detail hereinbefore, is capable of rapidly making the identification card simply by operating key contacts in the keyboard arrangement. Moreover, since what is to be printed on the identification card is reproduced on the monitor television set, an erroneous reproduction of the necessary information can advantageously be avoided.

Furthermore, since the necessary information including some items to be copied in the form as they are is converted into a video signal, the present invention makes it possible to prepare the identification card in a substantially short period of time and the machine according to the present invention, therefore, contributes to reduction of the labor heretofore required to perform this kind of job.

Although the present invention has been fully described in connection with the preferred embodiments thereof with reference to the accompanying drawings, it should be noted that various changes and modifications will be apparent to those skilled in the art. Therefore, such changes and modifications are, unless they depart from the true scope of the present invention, to be understood as included therein.

What is claimed is:

1. An apparatus for automatically issuing an identification card which comprises, in combination:
   information forming means for forming into a video signal information to be ultimately placed on the identification card, said information forming means having an information storage device for electromagnetically storing said information to be ultimately placed on the identification card in the form of coded information, a keyboard arrangement having a plurality of keys corresponding to the contents stored in said information storage device, a control device coupled between said keyboard arrangement and said information storage device for selecting out of the contents stored in said information storage device the desired information by operating some of the keys in said keyboard arrangement, and an information compiling device coupled to said information storage device, and said information compiling device having buffer storage device for compiling all of said coded information selected by said keyboard arrangement from the contents stored in said information storage device into the form of said video signal to be ultimately placed on the identification card;
   optical means coupled to said information forming means for converting said video signal into rays of light; and
   a transfer-type electrophotographic copying device including a charging means, an exposing station, an image transferring means and a separation means and a photoreceptor drum supported in position for rotation in sequence past said respective means; said optical means including an optical fiber tube for coverting said video signal, which is applied thereto from said information compiling device, into rays of light, and a bundle of image transmitting optical fibers positioned between said optical fiber tube and said photoreceptor drum for projecting said rays of light onto said photoreceptor drum at said exposing station.

2. An apparatus as claimed in claim 1, further comprising a monitor television set coupled to said information compiling device video signals applied thereto from said information compiling device to make sure whether or not the information selected by the keyboard arrangement is correct.

3. An apparatus as claimed in claim 1, further comprising optical character read-out means coupled to said information compiling device for feeding to said information compiling device desired character information in the form of a video signal other than the information stored in said information storage device.

4. An apparatus as claimed in claim 3, wherein said optical character read-out means includes an illumination unit for illuminating and desired character information while scanning in accordance with the scanning of the video signal, an optical detector device for detecting rays of light indicative of the information illuminated, and a device coupled to said optical detector device for coding into a video signal the character information by synchronizing the output signal from said optical detector device with the scanning of said video signal.

* * * * *